United States Patent [19]

Roch et al.

[11] Patent Number: 4,477,754
[45] Date of Patent: Oct. 16, 1984

[54] INTERACTIVE MACHINING SYSTEM

[75] Inventors: Gerald V. Roch, Indianapolis, Ind.; James P. Wiles, Olean, N.Y.; Chris L. Hadley, Indianapolis, Ind.

[73] Assignee: Hurco Mfg. Co. Inc., Indianapolis, Ind.

[21] Appl. No.: 305,511

[22] Filed: Sep. 25, 1981

Related U.S. Application Data

[63] Continuation of Ser. No. 151,909, May 21, 1980, abandoned, which is a continuation of Ser. No. 702,569, Jul. 6, 1976, abandoned.

[51] Int. Cl.³ .............................................. G05B 19/42
[52] U.S. Cl. ................................... 318/568; 318/569; 318/572; 364/474; 364/167
[58] Field of Search ................ 318/568, 569, 570, 571, 318/572; 364/474, 120

[56] References Cited

U.S. PATENT DOCUMENTS

| | | | |
|---|---|---|---|
| 3,878,983 | 4/1975 | Hamill et al. | 318/569 |
| 3,941,987 | 3/1976 | Tack, Jr. | 318/571 |
| 3,986,010 | 10/1976 | Lankford et al. | 318/572 |
| 4,010,356 | 3/1977 | Evans et al. | 318/568 |
| 4,074,349 | 2/1978 | Ueda | 364/474 |
| 4,074,350 | 2/1978 | Roch et al. | 364/474 |
| 4,115,858 | 9/1978 | Kaufman | 318/571 |

*Primary Examiner*—B. Dobeck
*Attorney, Agent, or Firm*—Woodard, Weikart, Emhardt & Naughton

[57] ABSTRACT

A microprocessor numerical control for a milling machine including means for programming part features by the machine operator at the machine location. The control apparatus includes a CRT display which provides an inquiry system, and a keyboard for entry of data by the machine operator. The control system further includes a tape cassette deck operable to read or write data or program material into or out of the processor memory. The control system regulates motion in the X, Y and Z directions for the milling machine and also includes an external feed rate adjustment for either the XY plane or the Z axis direction which may be utilized by the machine operator to affect the programmed feed rates. There is further provided automatic tool length calibration and cutter diameter compensation for milling operations.

19 Claims, 46 Drawing Figures

| FEED RATE | 7 | 6 | 5 | 4 | 3 | 2 | 1 | 0 |
|---|---|---|---|---|---|---|---|---|
| PROGRAMMED VALUE | X | | | | | | | |
| PROG. VALUE $\left(\frac{BIT\ WEIGHT}{128}\right)$ | | X | X | X | X | X | X | X |
| PROG. VALUE + 6"/M | X | X | X | X | X | X | X | X |
| PROG. VALUE + 3"/M | X | X | O | O | O | O | O | O |

| FEED RATE | 7 | 6 | 5 | 4 | 3 | 2 | 1 | 0 |
|---|---|---|---|---|---|---|---|---|
| 50"/M | X | | | | | | | |
| 50 $\left(\frac{BIT\ WEIGHT}{128}\right)$"/M | | X | X | X | X | X | X | X |
| 140 $\left(\frac{BIT\ WEIGHT}{256}\right)$"/M | X | X | X | X | X | X | X | X |

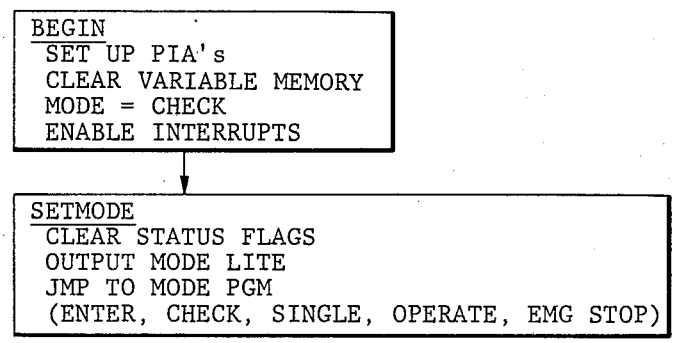
*Fig. 14*
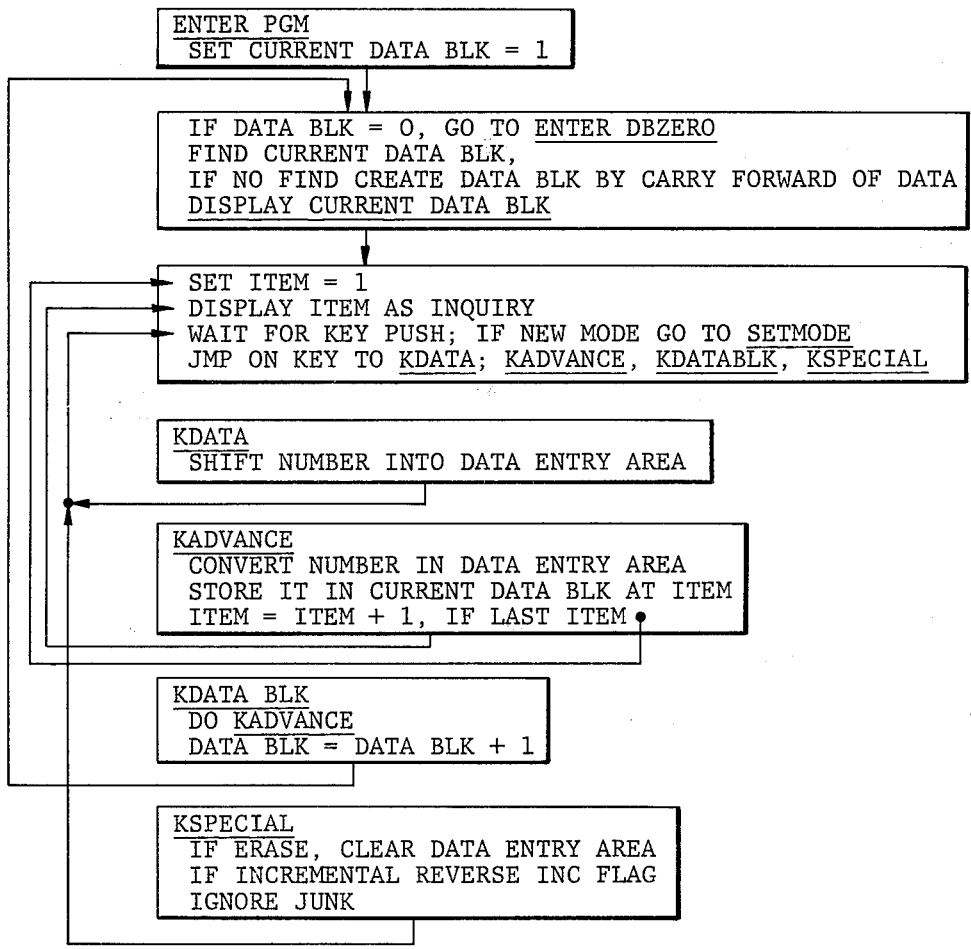
*Fig. 15*
*Fig. 16*

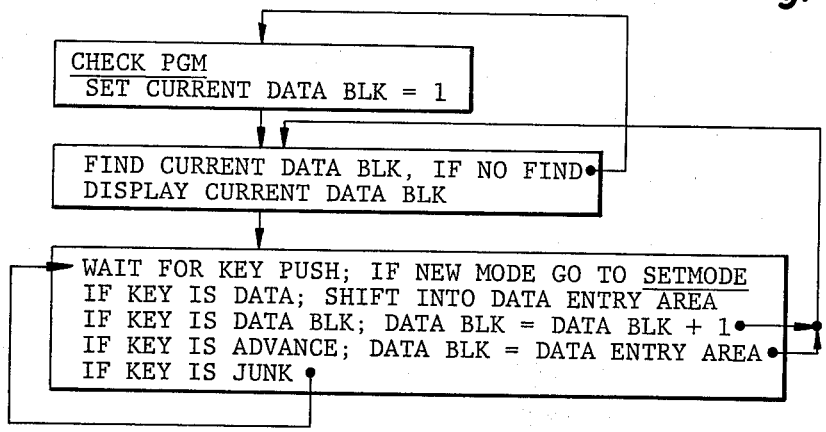

```
ENTER DBZERO
 DISABLE ZAXIS TO ALLOW MANUAL MOVEMENT
 DISPLAY X&Y OFFSETS, CONSECUTIVE TOOL NUMBERS & TOOL
 DIA & TOOL LENGTHS.
 ALLOW VALUES TO BE ENTERED BY KEYBOARD
 ALLOW TOOL CALLENGTH TO BE ENTERED AS A FUNCTION OF
 ZAXIS POSITION.
```

*Fig. 17*

```
DISPLAY CURRENT DATA BLK
 FILL CRT BUFFER WITH BLANKS
 FOR EACH ITEM:  PUT TITLE INTO CRT BUFFER AT ITEM
 LOCATION
                 FETCH ITEM VALUE FROM CURRENT DATA BLK
                 PUT NUMERIC VALUE INTO CRT BUFFER
                 FOLLOWING TITLE
```

*Fig. 18*

```
CHECK PGM
 SET CURRENT DATA BLK = 1

FIND CURRENT DATA BLK, IF NO FIND
DISPLAY CURRENT DATA BLK

WAIT FOR KEY PUSH; IF NEW MODE GO TO SETMODE
IF KEY IS DATA; SHIFT INTO DATA ENTRY AREA
IF KEY IS DATA BLK; DATA BLK = DATA BLK + 1
IF KEY IS ADVANCE; DATA BLK = DATA ENTRY AREA
IF KEY IS JUNK
```

*Fig. 19*

```
SINGLE PGM
 SET SINGLE STEP FLAG
 GO TO OPERATE PGM
```

*Fig. 20*

```
EMG STOP PGM
 ZERO ALL MOTION
 WAIT TILL MODE = CHECK
 GO TO SETMODE
```

*Fig. 21*

```
OPERATE PGM
   ┌─IF NEW MODE, GO TO SETMODE
   │ DO XYCAL
   │ DO ZTCAL
   │ IF SPINDLE CAL KEY PUSHED, DO ZZERO
   │ IF TABLE CAL KEY PUSHED, DO XYMARKER
   │ IF START KEY PUSHED, CHECK POSITION MODE SW,
   │ ELSE●    IF AUTO, GO TO AUTO
   │         IF JOG,
   └─              SELECT AXIS, SET JOG FLAG,
                   PUT  50 INCH IN THAT AXIS,
                   SET FREEDRATE = 50 IPM,
                   GO TO DOMOVE,
              IF TAPE, READ OR WRITE DATA BLOCK TO OR FROM
              CASSETTE.
```

*Fig. 22*

```
XYCAL
   FOR X & Y AXES
   OFFSET SAV + POS → POS
   POS - OFFSET → POS
   OFFSET → OFFSETSAV
   RETURN
```

*Fig. 23*

```
ZTCAL
   FOR Z AXIS
   Z OFSAV + ZPOS → ZPOS
   CURRENT TOOL CALLENGTH → ZOFFSET
   ZPOS - ZOFFSET → ZPOS
   ZOFFSET → ZOFSAV
```

*Fig. 24*

```
ZZERO
   DO ZRETRACT
   RUN ZAXIS DOWN UNTIL NOT ON LIMIT SWITCH AND MARKER
   PULSE FOUND
   SET ZPOS = 8.00
   RETURN
```

*Fig. 25*

```
XYMARKER
   JOG X & Y IN MINUS DIRECTION
   WHEN MARKER SWITCH SET SLOW FOR THAT AXIS
   WHEN SLOW AND MARKER PULSE, ZERO POSITION & STOP THAT
   AXIS
   WHEN BOTH AXIS STOPPED, RETURN
```

*Fig. 26*

```
NEXTDB
  IF PRESENT DATABLK IS STOP, GO TO OPERATE PGM(STOP)
  INCREMENT TO NEXT DATA BLK
  IF MODE IS SINGLE, GO TO OPERATE PGM(STOP)
  IF TOOL IS CHANGED, GO TO OPERATE PGM(STOP)
```
```
AUTO
  IF STP/REP, PUSH ONTO STP/REP STACK AT NEXT LEVEL
        XPOS, YPOS, DATA BLK NO.
  IF REPEAT, GO TO REPEAT
  JUMP TO TYPE PGM: (POSITION, MILL, DRILL, BORE)
```

*Fig. 27*

```
POSITION
  DO ZRETRACT
  DO GET XY FROM DATA BLK
  SET RAPID
  DO DOMOVE
  WAIT ERROR SMALL
  GO TO NEXTDB
```

*Fig. 28*

```
MILL
  DO ZTODOWN
  DO GET XY FROM DATA BLK
  IF INSIDE OR OUTSIDE GO TO FRAME
  DO DOMOVE
  WAIT ERROR SMALL
  IF NEXT DATABLK TYPE NOT MILL, DO ZRETRACT
  GO TO NEXTDB
```

*Fig. 29*

```
BORE
  SET BORE FLAG
```
```
DRILL
  DO ZRETRACT
  DO GET XY FROM DATA BLK
  SET RAPID
  DO DOMOVE
  WAIT ERROR SMALL
  IF NEXT DB CONTAINS MILL INSIDE OR OUTSIDE, OFFSET
      XY BY ±1/2 CURRENT TOOL DIA
  DO RAPID TO ZUP
  WAIT ERROR SMALL
  IF PECK GO TO DOPECK
```
```
DCONTINUE
  DO Z TO DOWN
  DELAY 0.3 SEC
  IF NEXT DATA BLK TYPE IS MILL, GO TO NEXTDB
  IF BORE FLAG, DO SLOW TO ZUP
  DO ZRETRACT
  GO TO NEXTDB
```

*Fig. 30*

```
ZRETRACT
  SET ZD = 10.0 IN
  SET ZRET FLAG
  SET RAPID
  DO DOMOVE UNTIL ZUP LIMIT SWITCH
  RETURN
```

*Fig.31*

```
GET XY FROM DATA BLK
  IF DATA BLK INCREMENTAL
          XD = XD + XVAL (DATA BLK)
          YD = YD + YVAL (DATA BLK)
     ELSE
          XD = XVAL (DATA BLK)
          YD = YVAL (DATA BLK)
  PXYFDR = FEEDRATE (DATA BLK)
  RETURN
```

*Fig.32*

```
WAIT ERROR SMALL
  LOOP UNTIL XERR, YERR, & ZERR ARE ALL LESS THAN .003"
  RETURN
```

*Fig.33*

```
ZTODOWN
  ZD = ZDOWNVAL (DATA BLK)
  PZFDR = FEEDRATE (DATA BLK)
  DO DOMOVE
  RETURN
```

*Fig.34*

```
RAPID TO ZUP
  ZD = ZUPVAL (DATA BLK)
  SET RAPID
  DO DOMOVE
  RETURN
```

*Fig.35*

```
SLOW TO ZUP
  ZD = ZUP VAL (DATA BLK)
  PZFDR = FEEDRATE (DATA BLK)
  DO DOMOVE
  RETURN
```

*Fig.36*

```
DO PECK
    ZPECKP = ZUP (DATA BLK)
    DZPECK = ZUP (DATA BLK) - ZDOWN (DATA BLK)
                        NPECK
 ┌─▶ ZD = ZPECKP
 │   SET RADID
 │   DO DOMOVE
 │   NPECK = NPECK-1 IF ZERO ──▶ GO TO DCONTINUE
 │   ZPECKP = ZPECKP - DZPECK
 │   ZD = ZPECKP
 │   PZFDR = FEEDRATE (DATA BLK)
 │   DO DOMOVE
 │   DO RAPID TO ZUP
 └── LOOP
```

*Fig. 37*

```
DOMOVE
    IF XYMOVE, ELSE ──────────────────▶ IF ZMOVE
    DO FRATE                             DO FRATE
    DX = XD-XPOS                         DZ = ZD-ZPOS
    DY = YD-YPOS                         DL = DZ
    DL = √DX² + DY²                      NNN = DL*SPM/FDR
    NNN = DL*SPM/FDR                     ZINC = DZ/NNN
    XINC = DX/NNN
    YINC = DY/NNN
```

```
INTERPOLATE
 ┌─▶ EVERY 20TH TIME, DO LEAD SCREW COMP
 │   IF FEEDRATE POT CHANGED, GO TO DOMOVE
 │   IF JOGFLAG AND NOT START BUTTON, CLEAR JOGFLAG AND GO
 │     TO OPERATE PGM
 │   NNN = NNN-1
 │   IF NNN = 0, GO TO FINISH MOVE
 │   FOR X, Y AND Z DO
 │         POS = POS + INC
 │   WAIT UNTIL COMMAND BUFFER HAS OPENING
 │   FOR X, Y AND Z DO
 │         MOV = POS + LSC - OLD
 │         OLD = POS + LSC
 │         MOV ──▶ COMMAND BUFFER
 │   DISPLAY X, Y AND Z VALUES ON CRT
 └── GO TO INTERPOLATE
```

*Fig. 38*

```
FRATE
  IF ZMOVE, PFDR = PZFDR
  IF XYMOVE, PFDR = PXYFDR
  IF RAPID, FDR = 250
  IF POT<0.5,
  FDR = PFDR * 2 * POT.
  IF POT>0.5,
  FDR = PFDR + 8 (POT -.5).
  RETURN
```

Fig. 39

```
LEAD SCREW COMP
  FOR X, Y AND Z DO
  LSC = POS * KLSERR
  RETURN
```

Fig. 40

```
FINISH MOVE
  XPOS = XD
  YPOS = YD
  ZPOS = ZD
  CALCULATE MOV, PUT IN COMMAND BUFFER
  RETURN
```

Fig. 41

```
REPEAT
  OPERATE ON BOTTOM OF STP/REP STACK
  IF FIRST FLAG, CLEAR IT, NXI = NX (DATA BLK)
                         & NXC = NX (DATA BLK)
                         & NYC = NY (DATA BLK)
  DO Z RETRACT
  IF NXC = 0,

NXC = NXC-1
  XD = XPOSC + XVAL (DATA BLK)
  XPOSC = XD
  YD = YPOSC
  DO DOMOVE
  SET DATA BLK TO STP/REP START
  GO TO REPEAT LOOP

NXC = NXI
  IF NYC = 0, PULL STP/REP STACK, GO TO NEXT DB
  NYC = NYC-1
  XPOSC = XPOSI
  XD = XPOSC
  YD = YPOSC + YVAL (DATA BLK)
  YPOSC = YD
  SET DATA BLK TO STP/REP START
  GO TO REPEAT LOOP
```

Fig. 42

```
FRAME
  MOVE +Y ± TOOL DIA.
  MOVE +X ± TOOL DIA.
  MOVE -Y ± TOOL DIA.
  MOVE -X ± TOOL DIA.
  DO ZRETRACT
  ELIMINATE XY OFFSET (∓ 1/2 TOOL DIA.)
  GO TO NEXTDB
```

*Fig. 43*

INTERACTIVE MACHINING SYSTEM

This application is a continuation of application Ser. No. 151,909 filed May 21, 1980, now abandoned, which is a continuation of Ser. No. 702,569 filed July 6, 1976 now abandoned.

Various types of machine control systems are known, such as for milling machines, utilizing various metalworking tools. Typically, such numerical controls provide signals to serve motors associated with each of the X, Y and Z axes of the machine and are programmed from a punched paper tape. If modifications are to be made in a particular program, a new tape must be made, generally at a location remote from the milling machine, thereby causing a delay in machine usage.

Other larger computer controls have been devised for controlling various types of machines with attendant higher cost, larger size etc. An example of such a numerical control system is shown in U.S. Pat. No. 3,746,845 to Henegar et al.

The presently disclosed machine control system includes a servo apparatus associated with each axis of the three axes of a milling machine and a control module coupled to the servos by appropriate wiring. The control module includes a cabinet containing a microprocessor and its related supporting circuitry, servo amplifiers, etc. A control panel is pendently mounted above and extending outwardly from the cabinet. The control panel includes various operator controls, a CRT display screen, a data entry keyboard and a cassette tape deck.

The presently disclosed apparatus further includes a Z axis carriage and frame for spindle motion specially designed to increase rigidity of the Z axis spindle during an operation such as drilling. Also utilized is a feed rate adjust control for the operator of the machine with a unique interaction with the program feed rates of the controller.

It should be noted that while the present apparatus described in conjunction with the presently disclosed control system is a milling machine, other types of equipment wherein motion may be controlled in a programmed fashion may be controlled by the presently described control system.

Further features and advantages of the present invention shall be apparent from the following detailed description and accompanying figures, wherein:

FIG. 1 is a front view of a three axis mill adapted for operation with a controller according to the present invention, shown with the control cabinet and pendently mounted control panel.

FIGS. 2a and 2b comprise a block diagram of the hardware associated with the controller.

FIGS. 3–8a, 8b, are more detailed illustrations of the peripheral interface adaptors of FIGS. 2a, 2b, shown in conjunction with external apparatus with which they interface.

FIG. 13a is a chart showing the effect of the feed rate adjust potentiometers when the controller is in the AUTO mode.

FIG. 13b is a chart similar to that of FIG. 13a for the controller in the JOG mode.

FIGS. 14–43 are the various elements of a flow chart illustrating the operation of the software associated with the presently disclosed control system.

DESCRIPTION OF THE PREFERRED EMBODIMENT

Figure 1:
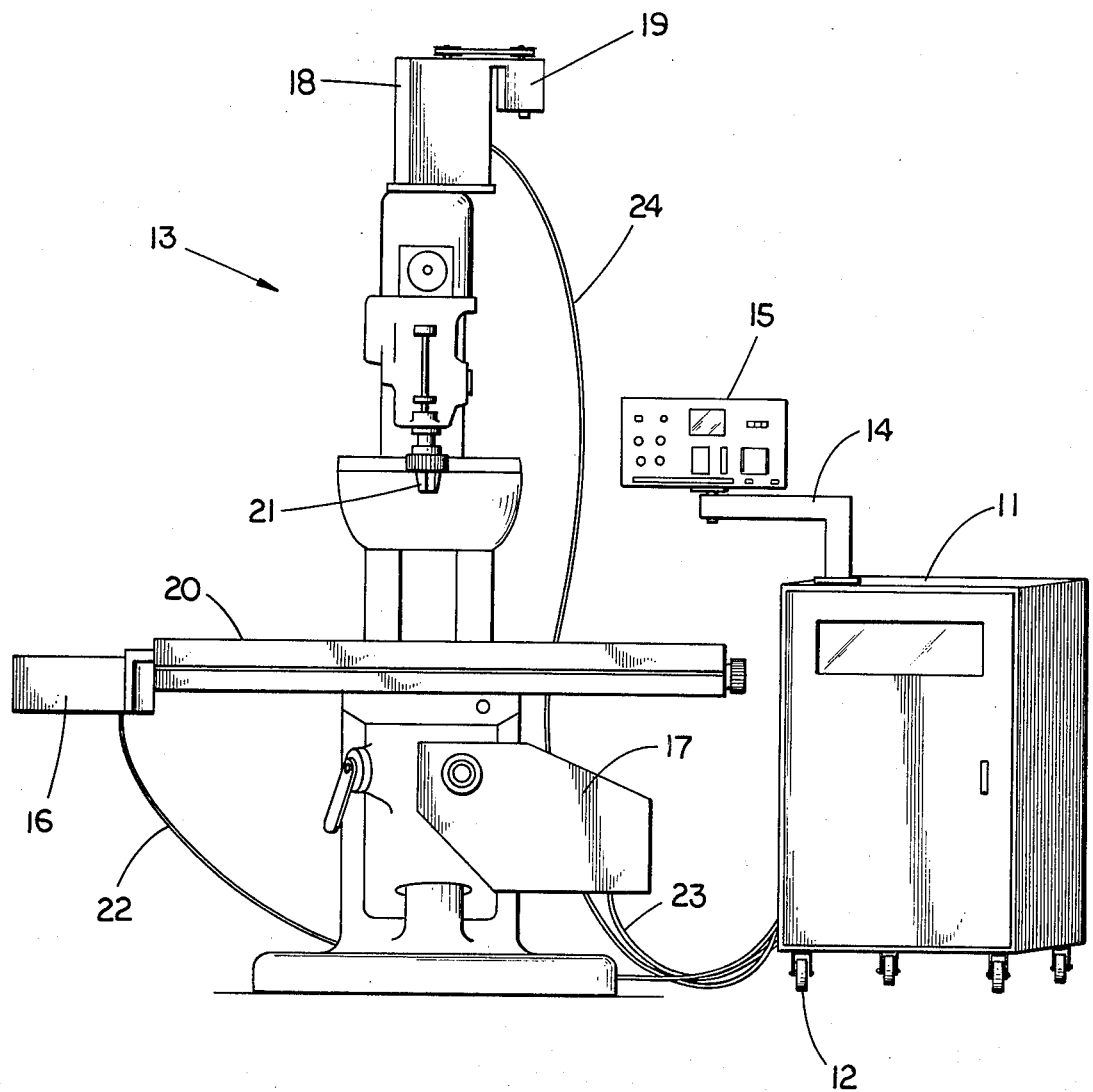

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being comtemplated as would normally occur to one skilled in the art to which the invention relates.

Referring in particular to FIG. 1, there is shown a control cabinet and control panel together with a 3 axis mill adapted for operation therewith. Cabinet 11 contains the electronic hardware for the control system and is mounted on casters 12 so as to be locatable beside or behind the 3 axis mill 13. Arm 14 extends upwardly and outwardly from the top of cabinet 11 to provide pendent mounting for a control panel 15 conveniently positioned for easy access by the operator of the mill. Control panel 15 shall be discussed in more detail hereinafter.

The movement control signals and position information signals are coupled between the servo motor assemblies and the control circuitry by cables 22, 23 & 24 as shown. An enclosed X axis servo assembly 16 and an enclosed Y axis servo assembly 17 are shown in their appropriate locations on the mill. The Z axis servo assembly is shown generally at 18 without its normal casing, and further showing limit switch subassembly 19 which includes the encoder and limit switches as shall be described more particularly hereinafter. The servo motors for all three axes are essentially the same, and a limit switch subassembly such as 19 is associated with each servo.

As is known, table 20 of the milling machine is moved in the XY plane by screw drivers, which in this case are powered by servos 16 and 17. A Z axis spindle assembly 21 is rotated by a spindle motor and also moved in the Z direction by servo 18.

Figure 2A:
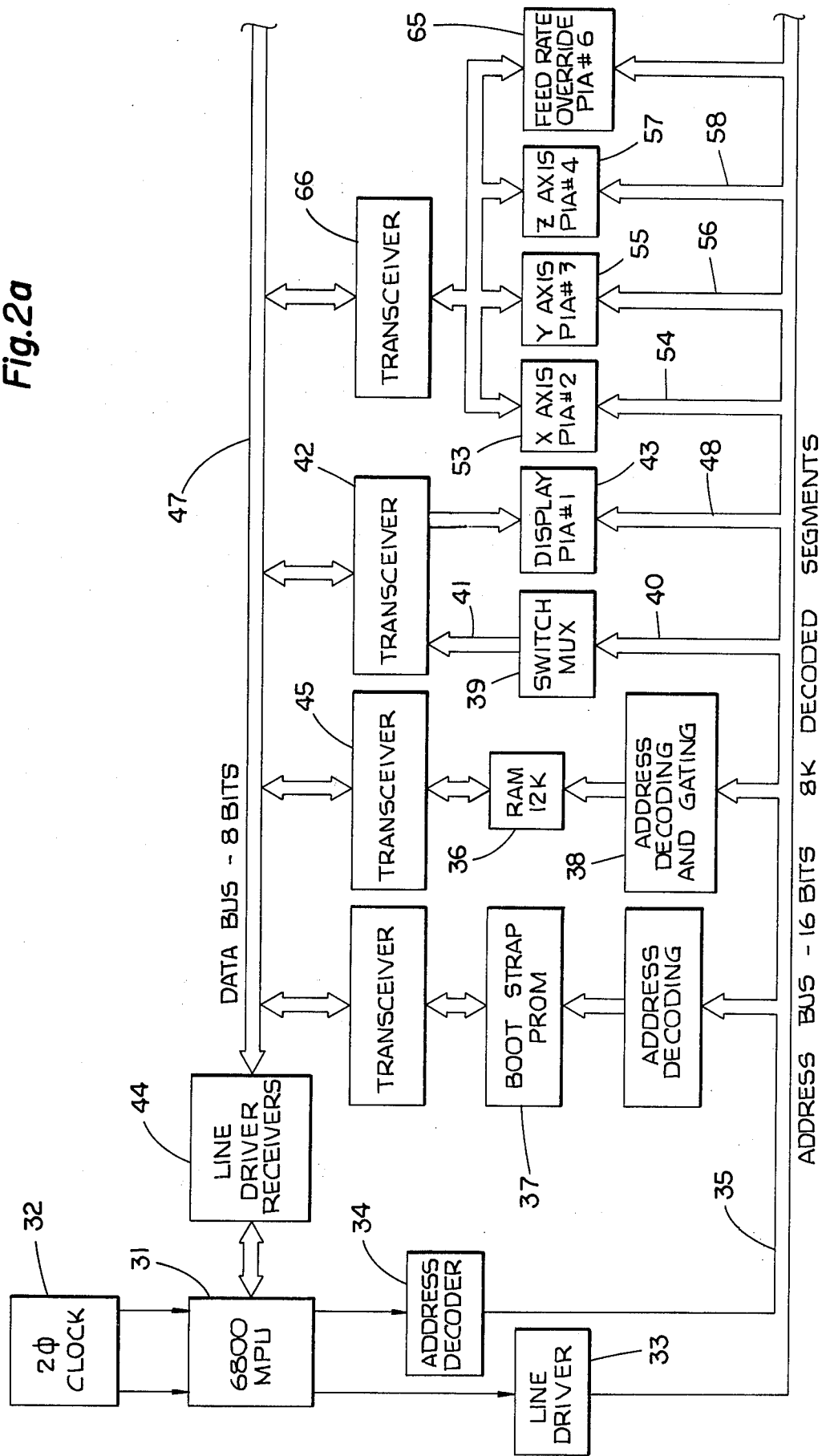
Figure 2B:
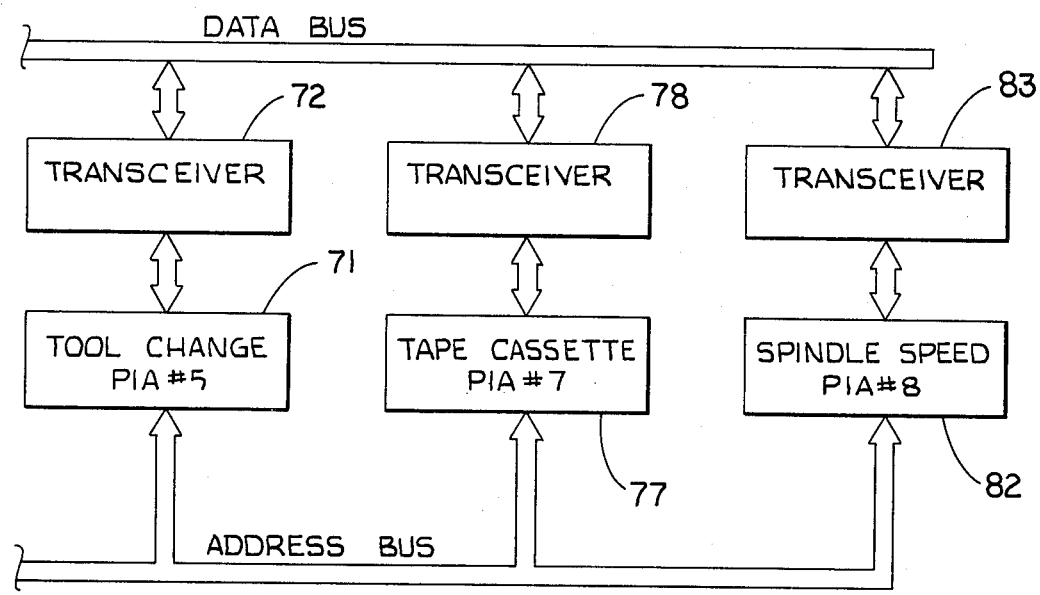

Referring now to FIGS. 2a and 2b there is shown a block diagram of the control system electronic hardware. As shown in FIG. 2, a microprocessor 31 receives clocking pulses from a two phase, non-overlapping, clock 32. The microprocessor is, in the exemplary embodiment, a Motorola 6800 MPU. The microprocessor 31 is coupled to both an 8 bit data bus and a 16 bit address bus. Address lines from microprocessor 31 are coupled through line drivers 33 and an address decoder 34 to the address bus 35.

The address information on bus 35 is actually divided into eight 8 K decoder segments. For example, two segments might be assigned to RAM 36 and an additional segment or segments assigned to the balance of the peripheral interface adapters (PIA's) or additional memory.

The PROM 37 is utilized for boot strapping the microprocessor 31 under initial start-up conditions. For example, the information stored in PROM 37 enables the microprocessor unit 31 to appropriately load a program into a RAM 36 from a magnetic tape cassette input. The primary functioning of the microprocessor and related circuitry is dictated by the control program resident in RAM 36 after initial set up. A further address decoder 38 is used to provide addressing of the RAM in the most economical fashion possible. Similar address decoding is utilized for PROM 37.

MUX 39 multiplexes 64 external indications down to 8 to accommodate the 8 bit data bus lines. The particular set of 8 switches addressed is selected by the address from the address bus on line 40 and the appropriate data-out indications are provided on line 41. Transceiver, or line driver-receiver, 42 provides application and directionality for the data bus line branch serving MUX 39 and display PLA 43. Transceiver 42 is of the same type as line drive-receiver 44 adjacent the microprocessor unit 31 and transceiver 45 between RAM 36 and the data bus line. The decoder and transceiver associated with PROM 37 are also similar to decoder 38 and transceiver 45 of RAM 36.

Figure 7:
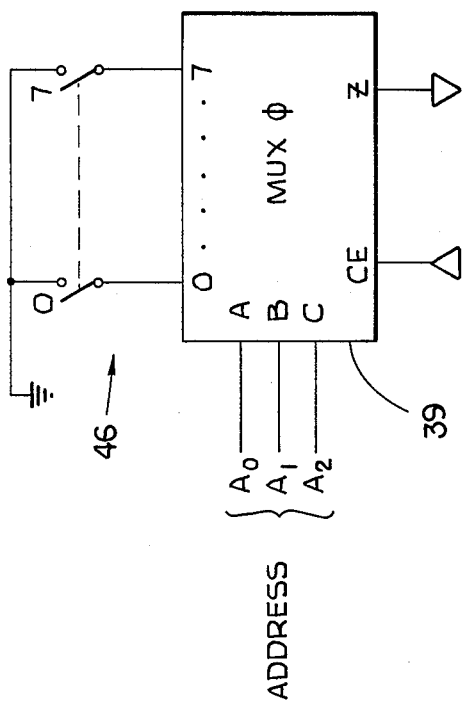

As shown in FIG. 7 one of eight binary addresses is provided on lines A0 through A2 from the address bus, and an address signal is received at the CE input to MUX 39 with decoder 34 addressing one of the 8 series of 8 switches as shown diagrammatically at 46. An appropriate data word dependent upon the settings of switches 46 is placed as an output from the Z terminal of MUX 39 to the transceiver 42. These switch settings may be limit switches on the machine, pushbuttons etc.

Figures 3, 13A, 13B:
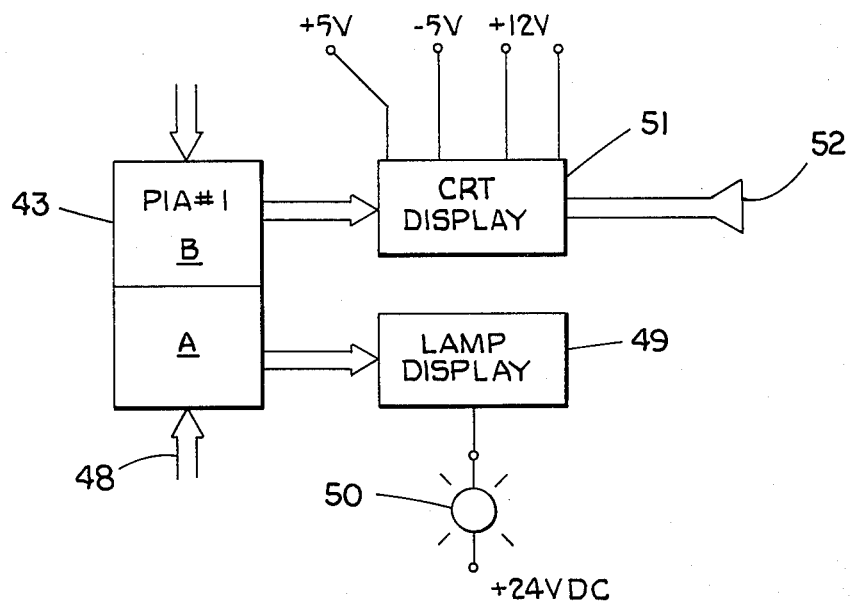

Display PIA 43, as indicated above, may receive information from the data bus 47. There are two sections, an A section and a B section, for PIA 43, (FIG. 3) as well as for the other PIA's disclosed herein. An address line 48 is operable to address either the A or B section of PIA 43. If section A of PIA 43 is addressed, the data from data bus 47 is coupled through transceiver 42 to the PIA 43, and the 8 bit word is coupled to a lamp display indicated at 49 in FIG. 3. In FIG. 3, an exemplary lamp 50 is shown coupled from lamp display 49. For an appropriate address through section A of PIA 43, a lamp such as 50 may be activated in response to the required level of the addressed data bit. With the appropriate addresses on line 48, CRT display 51 is addressed through section B of the PIA 43. Over an ensuing interval, data is sequentially provided to the PIA an interrupted by internal circuitry of display circuit 51 to produce alphanumeric characters on the screen of CRT 52.

Figure 4:
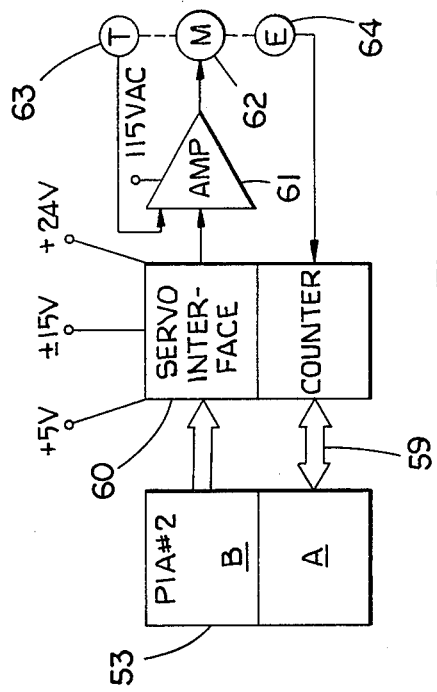

Another PIA 53 is addressed on line 54 and interfaces with the X axis drive of the mill. The Y axis PIA 55 is similarly addressed on line 56 and PIA 57 for the Z axis is addressed on line 58. Since these three axis controls operate essentially in the same manner, only the X axis PIA and its associated motor, amplifier etc., shall be described in detail herein. As shown in FIG. 4, PIA 53 has an A and a B section, and it is addressable by the above-mentioned address line 54 for each section A and B. If the A section is addressed, an 8 bit word is coupled on line 59 to the PIA, which word is indicative of relative position. This position indication is an output of an up/down counter comprising the lower portion of servo interface 60.

The upper, or B, portion of PIA 53 is an output to servo interface 60. A properly addressed command from the processor 31 is coupled to servo interface 60, which generates an analog voltage and couples it to the input of amplifier 61. Amplifier 61 runs motor 62 at an appropriate speed for the data information received. Feed back is provided by tachometer 63 to insure accurate motor speed control by amplifier 61. Appropriate encoding is done by encoder 64, which detects changes in position in the X direction of the milling table, and this encoded information is provided to the up/down counter in servo interface 60. In the case of the Z axis movement, the encoder detects the position of the tool head rather than a rectilinear table position.

Figure 6:
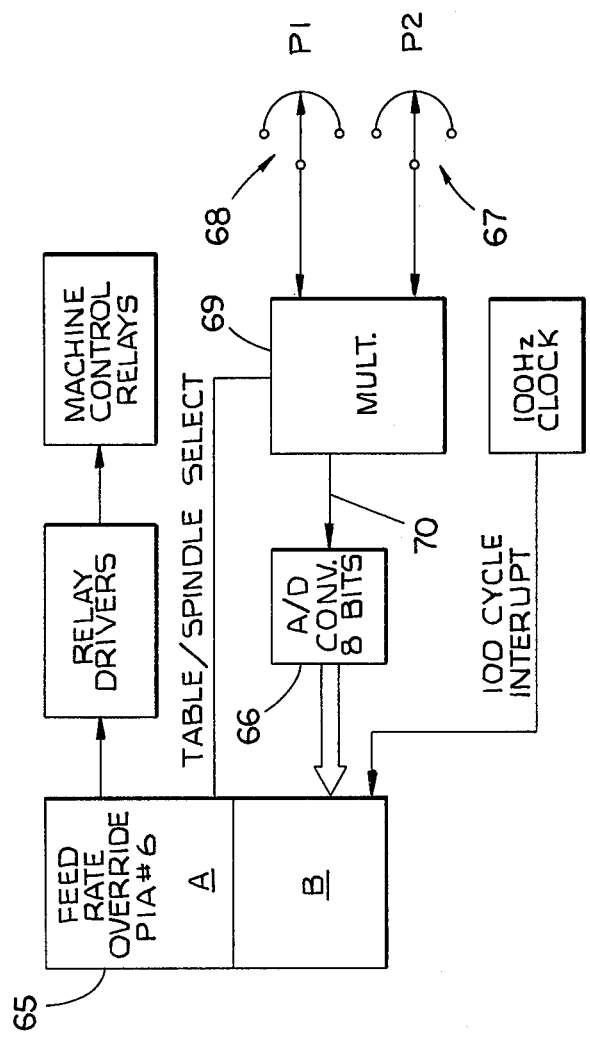

Feed rate override PIA 65 is also connected between transceiver 66 and address bus 35. As shown in FIG. 6, PIA 65 has an A section and a B section, each of which is addressable by a 2 byts address and each of which are coupled from data bus 47. A multiplexer 69 receives a selection indication from the microprocessor at a given time to select the output from either potentiometer 67 or potentiometer 68. The analog voltage indication from the selected pot is coupled on line 70 to the analog-to-digital converter 66. Potentiometer 67 is a spindle feed rate adjustment, and potentiometer 68 is a feed rate adjustment for the mill table. The digital output from converter 66 is utilized by the microprocessor to affect programmed speeds for the mill table and the mill spindle. A 100 hertz clock initiates inquiries to the feed rate override circuitry as shall be explained in more detail hereinafter. The feed rate modification information from potentiometer 67 and 68 is ultimately coupled to the relay drivers and machine control relays as shown.

Figure 5:
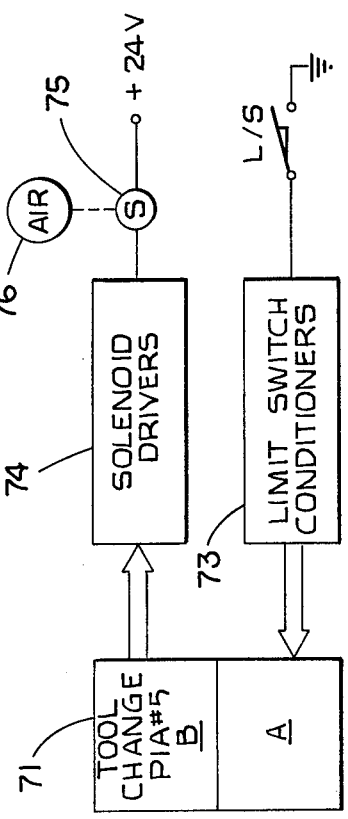

A tool change PIA 71 may optionally also be provided and is addressed and coupled to the data bus in the same fashion as those previously described, through a transceiver 72. The A section of PIA 71, as shown in FIG. 5, receives an 8 bit word indicative of various limit switch conditions from a limit switch conditioner 73. The B section of PIA 71 provides commands from the microprocessor unit 31 affecting solenoid drivers 74 and air-operated solenoid 75, powered by air from air source 76. The solenoid drivers and solenoids would position the appropriate tool requested by the processor unit in the working position in the mill head. The particular tool selected would then be detected through the limit switch conditioners 73.

Figure 8A:
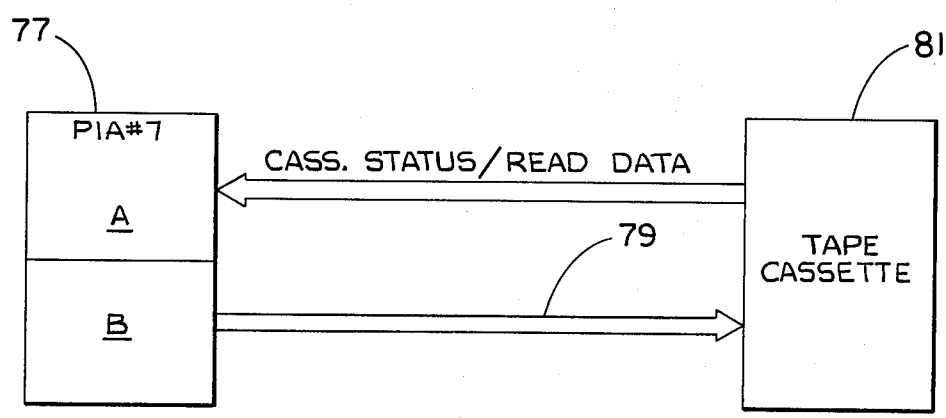
Figure 8B:
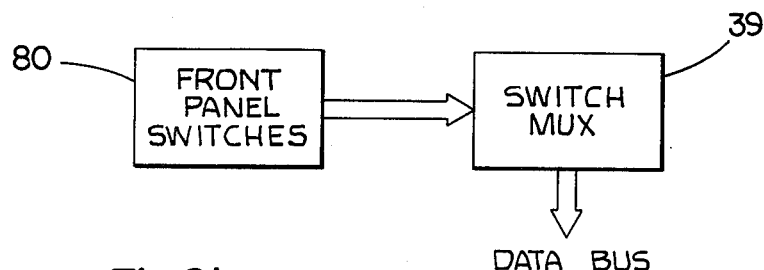

A tape cassette PIA 77 is coupled between address bus 35 and data bus 47 through transceiver 78. PIA 77 provides the inerfacing with a tape cassette which is utilized to load RAM 36. Also, a subsequently inserted cassette may be utilized to record stored RAM program data through PIA 77. Cassette control data is coupled through PIA 77 to the cassette on lines 79 as shown in FIG. 8a. Front panel switches shown generally at 80 provide inputs by way of a multiplexer 39 as described above to direct the cassette operation. The processor is also able to read data from the tape cassette 81 on a read command.

A spindle speed PIA 82 may also optionally be provided between the address bus and the data bus through transceiver 83. PIA 82 interface between the microprocessor and the motor driving the spindle of the tool head such as for a drilling operation. The amplifier and motor control operation for Z axis spindle speed control would be essentially the same at the shown earlier in regard to the motor control in FIG. 4.

Figure 9:
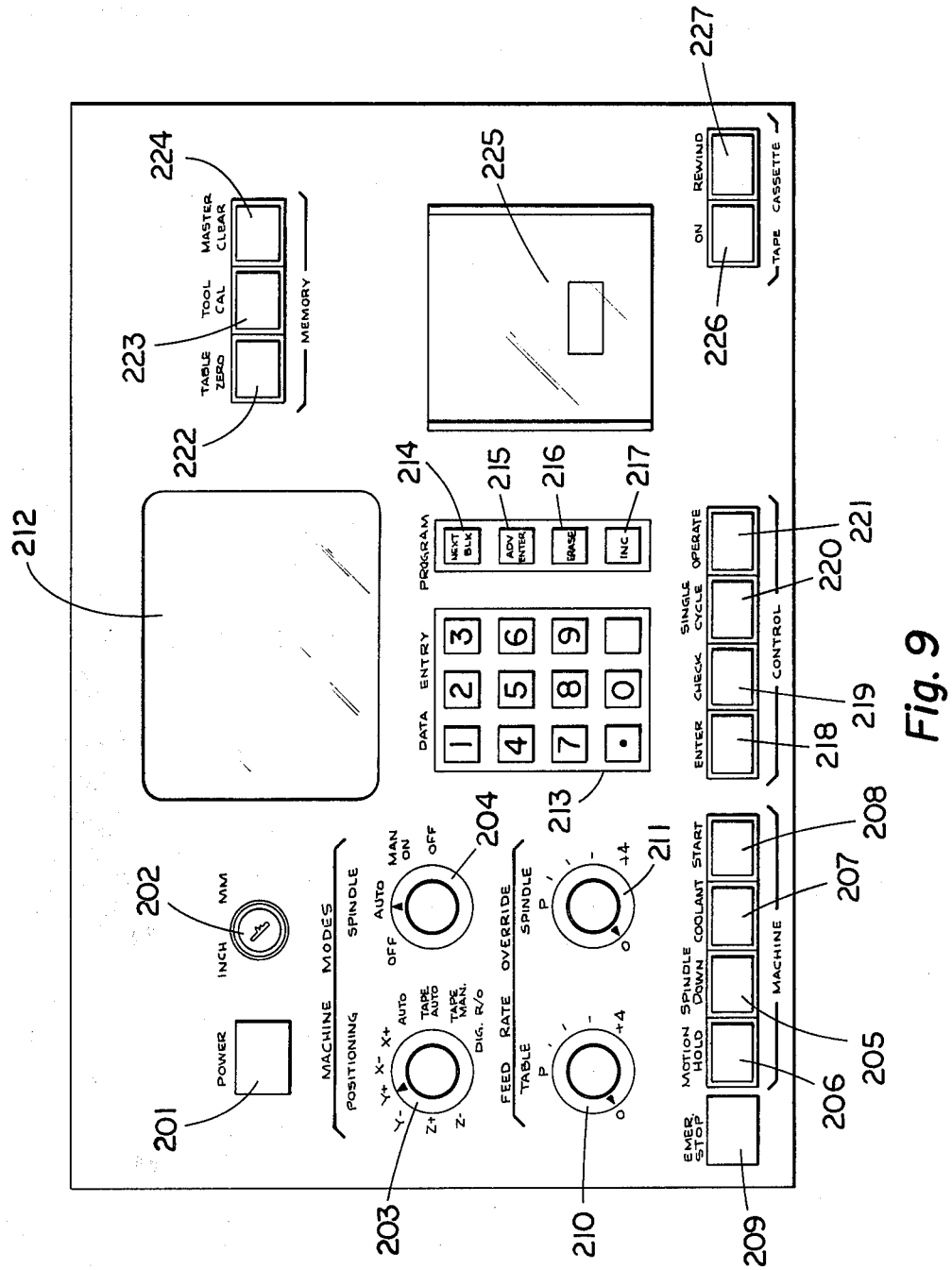
FIG. 9 is an enlarged front view of the control panel of FIG. 1.

Referring now to FIG. 9, there is shown the front panel of the control. The control panel includes a power switch 201 for providing electrical power to the control system and a key-lock inch-millimeter selector 202. A machine mode positioning control 203 has six positions for determining the X, Y or Z direction (plus or minus) for motion in JOG mode. Additionally control 203 may be placed in the auto mode for automatically positioning the X, Y and Z axes according to programmed information, or in one of two tape modes for energising the tape cassette. In the tape manual mode the cassette switches ON and REWIND 226 and 227 are enabled. Depressing switch 226 causes the tape transport to operate in the forward direction while depressing button 227 causes the transport to operate in the rewind direction. The tape auto position permits operation of the cassette under control of the stored program. In the digital readout mode, the X, Y and Z axis positions are displayed. In this mode, the servos for the three axes are disabled, and the machine may be manually operated and the control used as a digital readout device only.

In regard to spindle mode switch 204, when control 204 is in the off position, only the mill table moves in the X and Y direction and there is no Z direction movement for the spindle. In the auto position, the spindle is moved in the Z direction normally per program instructions. In the manual-on position the spindle is on and rotating, and a first depression of the spindle down push button 205 will cause the spindle to move to its Z down position, and a subsequent depression of push button 205 will result in the spindle returning to full up position. In the manual-off position for control 204, the spindle motor is deenergized and the Z axis feed is pre program only after the spindle down button 205 has been pushed, except Z moves to Z up dimension and remains until pushbutton 205 is depressed again. The spindle then retracts to its full up position.

Push button 206 is a motion hold button which stops all serve motion. Button 207 is operable while depressed to provide coolant for the tool being utilised in the vicinity of the workpiece. Button 208 starts operation of the mill when the control is in the operate or single cycle mode. Button 209 is an emergency stop button which remove power from the control and motors, etc.

Two feed rate override controls are provided. Knob 210 is the table feed rate override control, and when it is set at P (program) position no alteration of programmed table feed rate is obtained. Spindle control knob 211 is similarly set at P for no effect on the feed rate in the Z direction for the mill spindle. The manner in which these control settings effect programmed feed rates as they are moved to the left or right of P is discussed in more detail hereinafter. Spindle knob 211 and table knob 210 are coupled to potentiometers 67 and 68 of FIG. 6, respectively.

A CRT screen 212 is provided for displaying data blocks etc. A data entry keyboard 213 is supplied for placing data into the control memory in response to inquiries on the CRT 212. Program keys 214 through 217 are provided for various functions involving entry of data into memory for execution of the program. Next block key 214 advances the data block displayed on the CRT. Advance key 215 advance the current inquiry displayed at the bottom of the CRT screen to the next data item for that data block. If a number from keyboard 213 is entered through advance key 215, the CRT display will advance to the data block having a corresponding number. Erase key 216 erases an entry made in response to the particular item of inquiry at the bottom of the CRT (unless the data block number is at the bottom of the CRT, in which case all data is erased from that data block). Increment key 217 indicates, in response to an inquiry, that a dimension entered into a data block is to be measured from the last position rather then the initial reference position of the table or spindle. The sequence of inquiries on the CRT screen for a data block follows the sequence: data block number, machine mode, control mode, X dimension, Y dimension, Z dimension, feed rate, pack rate and tool number. In addition, for step-repeat blocks, the X and Y dimensions are requested as well as the number of repetitions in the X and Y directions. In a milling block, an inquiry is made as to whether or not the milling is inside or outside frame milling.

Therefore, the operator of the machine has control of the selection of number entries from the keyboard to identify various parameters in a data block. The operator makes the type selections by number keys on the keyboard, such as for Drill, Mill, etc. By appropriate digit entries through the keyboard, the operator has control of the machine operating mode, control operating mode and part program coordinates.

There are four mode or control keys provided. Key 218 places the program in the enter mode. Key 219 is for check mode, key 220 for single cycle operation and key 221 for operate mode. These modes are explained in further detail in regard to the program flow chart and description thereof.

Push buttons 222 through 224 affect various items in the memory of the control. Table zero 222 instructs the processor, in the operate mode, to look for marker switches to obtain a zero position. When the program is in data block zero the table zero may be established over the full range of table travel by pushing table zero 222 when the table is in the desired location. Programmed coordinates are then measured from the point. Button 223 controls tool calibration in a similar fashion. In data block zero, pushing tool calibration button 223 establishes individual tool length calibration for the respective tool number on the display. Tool length calibration may be established by manually lowering the Z axis with the tool in place in the spindle until it reaches a desired zero reference plane then depressing tool calibration button 223. These calibration operations are disclosed in further detail in the program flow chart for the processor.

Master clear push button 224 clears the machine set up information when the controller is in data block zero. When master clear is depressed with the processor at any other data block, all data is cleared from data blocks 1–99. A tape cassette transport apparatus is shown generally at 225 for receiving a magnetic tape cassette operable to read or write data to or from the RAM memory. With mode switch 203 in the tape auto mode, the data block entries may be recorded onto a tape cassette. In addition, previously recorded data may be read from the cassette and placed into the memory of the controller in order to duplicate a program established for operating on a workpiece to provide a desired part. Push button 226 turns on the tape cassette deck and push button 227 is available to rewind the tape after play or record. Read, write and search-for-data functions are controlled by data entry keys, when control 203 is in the TAPE auto mode. As indicated above in the tape manual mode the cassette switches ON and REWIND are enabled.

Figure 10:
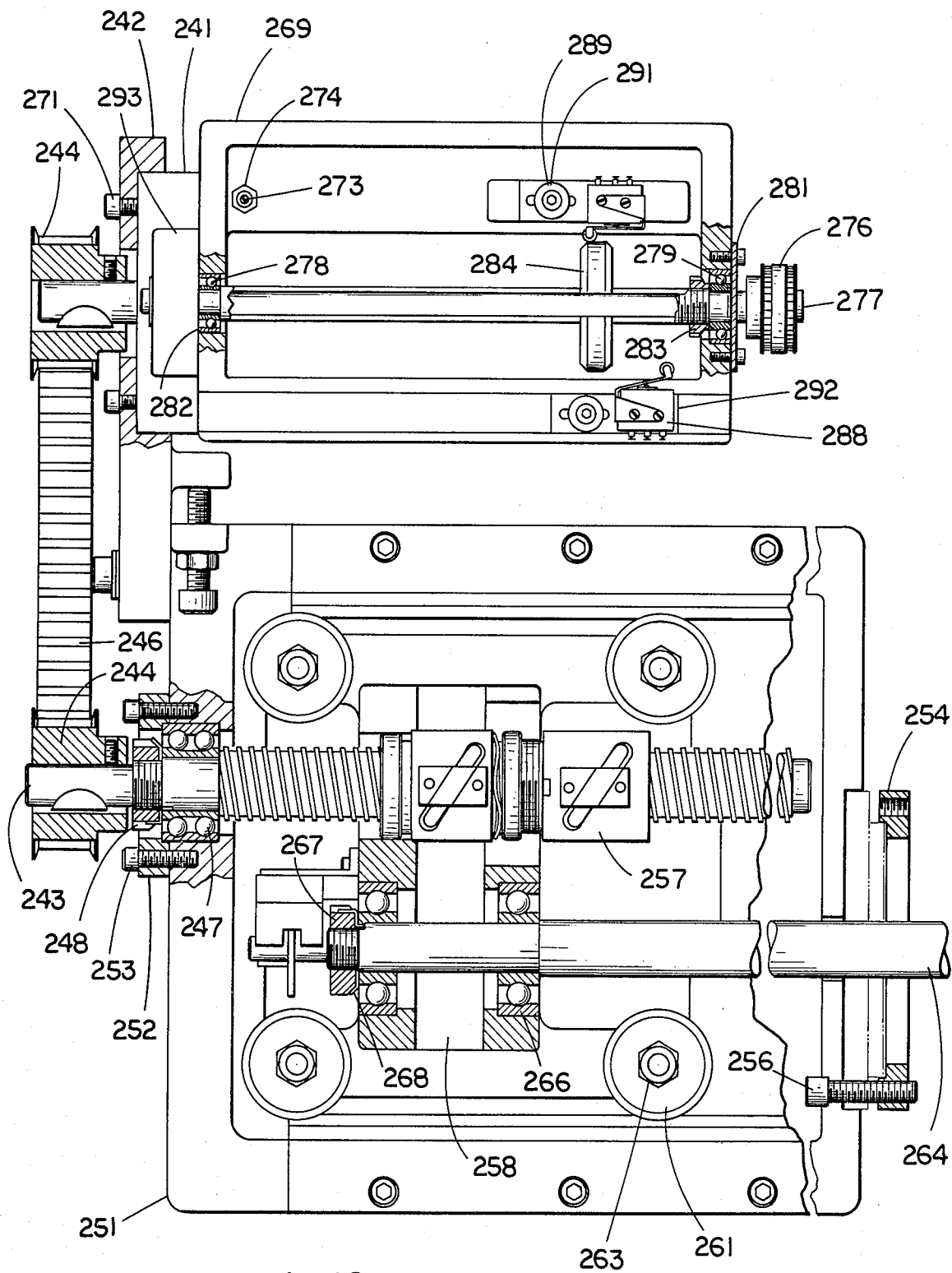
FIG. 10 is a sectional view of the Z axis servo apparatus of FIG. 1 shown on its side.
Figure 11:
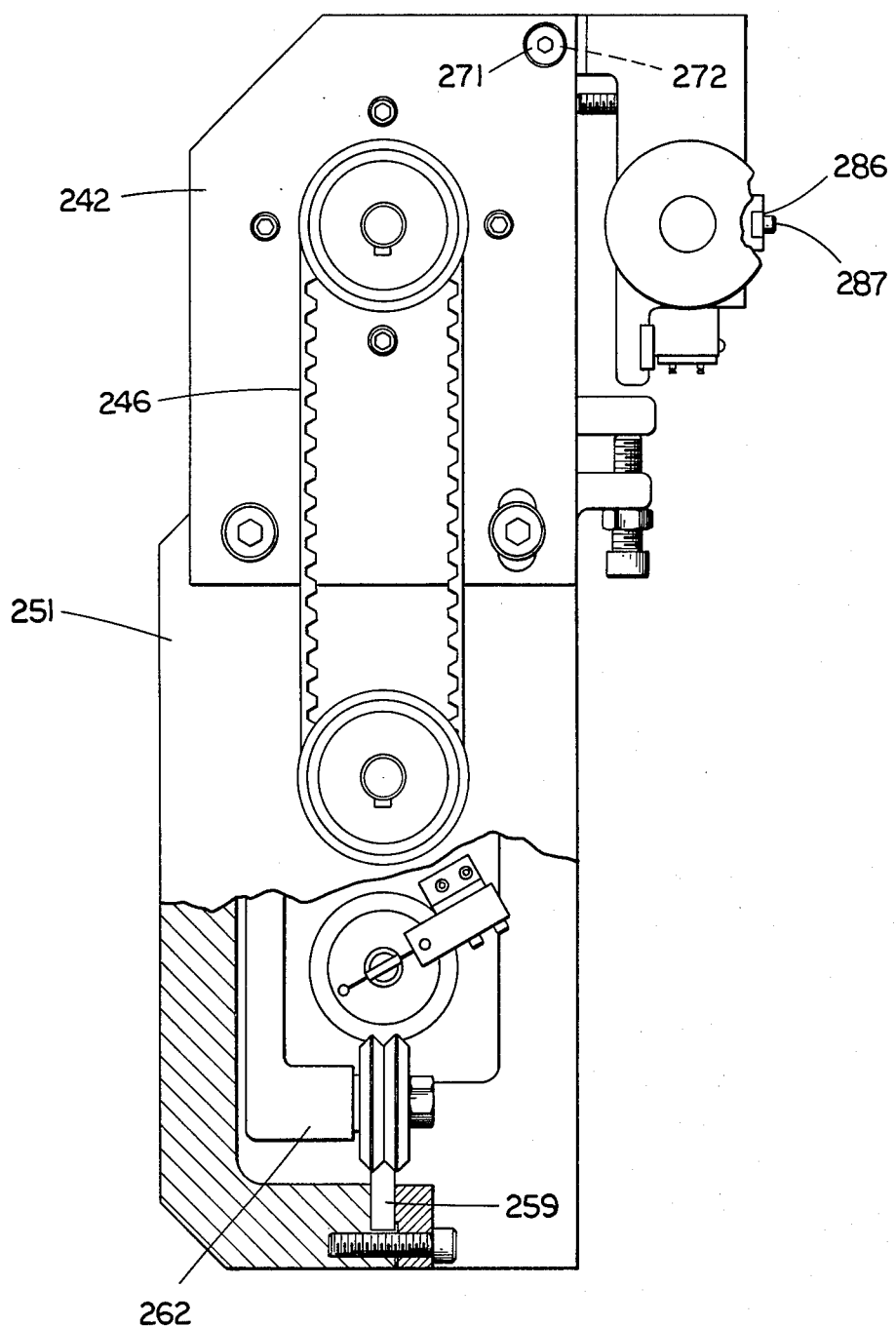
FIG. 11 is a top view of the Z axis servo apparatus of FIGS. 1 and 10.

Referring now to FIGS. 10 and 11, there is shown the Z axis drive and positioning apparatus. The Z axis drive provides a vertical servo motor-controlled feed drive system for the mill spindle and also provides a mechanical link for accurate linear positioning and feed rate control for vertical machining functions.

The drive for the spindle vertical feed is provided by a serve motor 241 which is mounted on a motor mounting plate 242. The motor mounting plate is adjustable relative to the Z axis spindle. The servo motor 241 drives a ball screw 243 through a pair of timing belt pulleys 244 and a timing belt 244. The ball screw is securely retained by a preloaded double race ball bearing 247 which allows rotation of the screw without any shaft end play. The inner race of the bearing is secured by a lock nut 248 and adjacent lock washer. The outer race is secured to the main frame 251 by a retainer cap 252 with cap screws 253. The main frame 251 is in turn rigidly secured to the mill head through a retainer plate 254 with cap screws 256.

Vertical motion of the spindle is obtained by rotation of the ball screw 243 driving a preloaded ball nut assembly 257 which is affixed to the Z axis carriage 258, which moves vertically on a set of "V" groove ways 259 via a mating set of four "V" rollers 261. Rollers 261 are mounted on the carriage by carriage adjusting studs in carriage portions 262 and by lock nuts 263. The adjusting studs have an eccentric shank upon which the "V" rollers 261 are mounted. Tightness of the carriage is adjusted by the eccentric moving the "V" rollers 261 in or out until the desired tightness is obtained.

The actual driving link between the mill spindle and the Z axis carriage 258 is a shank rod 264, which is attached to the carriage 258 by a pair of ball bearings 266 mounted in a preloaded state by compression of the flexible inner races with a bearing lock nut 267 and lock washer 268. The shank rod 264 is rigidly mounted in the mill spindle in tension by utilizing the existing spindle shank rod bearing and a tool adaptor (not shown) threaded to the shank rod.

Essentially, servo motor 241 drives ball screw 243 via a timing belt drive, driving preloaded ball nut 257. Ball nut 257 is mounted to the carriage 258, causing the carriage to travel vertically (in the FIG. to the right), trapped in "V" ways 259 by "V" rollers 261, driving the shank rod 264 which is mounted to carriage 258 by ball bearings 266. The bearings allow spindle rotation to be isolated from vertical drive. Thus the mill spindle is driven by being retained by a tool adapter (not shown) allowing accurate vertical spindle control when used with the limit switch assembly explained hereinafter.

In order to provide a method of mounting limit switches and an encoder on an isolated mount that will provide accurate measuring of long distance in less space, the present limit switch assembly has been utilized. It provides a stable, end-play free, mount for the encoder. The main frame 269 of the limit switch assembly is mounted to the motor mounting bracket 242 by a shoulder screw 271 and a lock nut 272. This provides an adjustable mount for timing belt tensioning. Set screw and lock nut 273 and 274 provide a positive stop after the desired setting is made. The driven belt 276 is driven by a pulley on the motor shaft extension and drives the driven shaft 277 which is mounted in compression between two bearings 278 and 279 in the main frame 269 by retainer 281 on the outer race of the front bearing 279 and a snap ring at 282 on the outer ring of the rear bearing 278. A shoulder on the driven shaft 277 provides the compression member, and nut 283 provides the adjustment for bearing 279. The driven shaft 277 is threaded with an extra-fine thread so that a ratio is obtained between the actual travel (rotation of motor shaft) and the travel of the L. S. DOG 284. L. S. DOG 284 is kept from rotating by guide bar 286 which is mounted on the main frame with cap screws 287. As the screw 277 rotates, L. S. DOG 284 moves linearly actuating the appropriate limit switch 288. The limit switches may be mechanical as shown, or also, for example, photoelectric. Adjustment of the limit switch location is made by loosening screw and washer 289 and 291 and sliding limit switch bracket 292 in the keyway in the main frame 269. An alternate setting method is to remove the guide bar 286 and rotate the L. S. DOG 284 to the desired setting and replace the guide bar. The encoder 293 is mounted to the main frame 269 with its encoding disc (not shown) rigidly mounted to the driven shaft 277.

Figure 12:
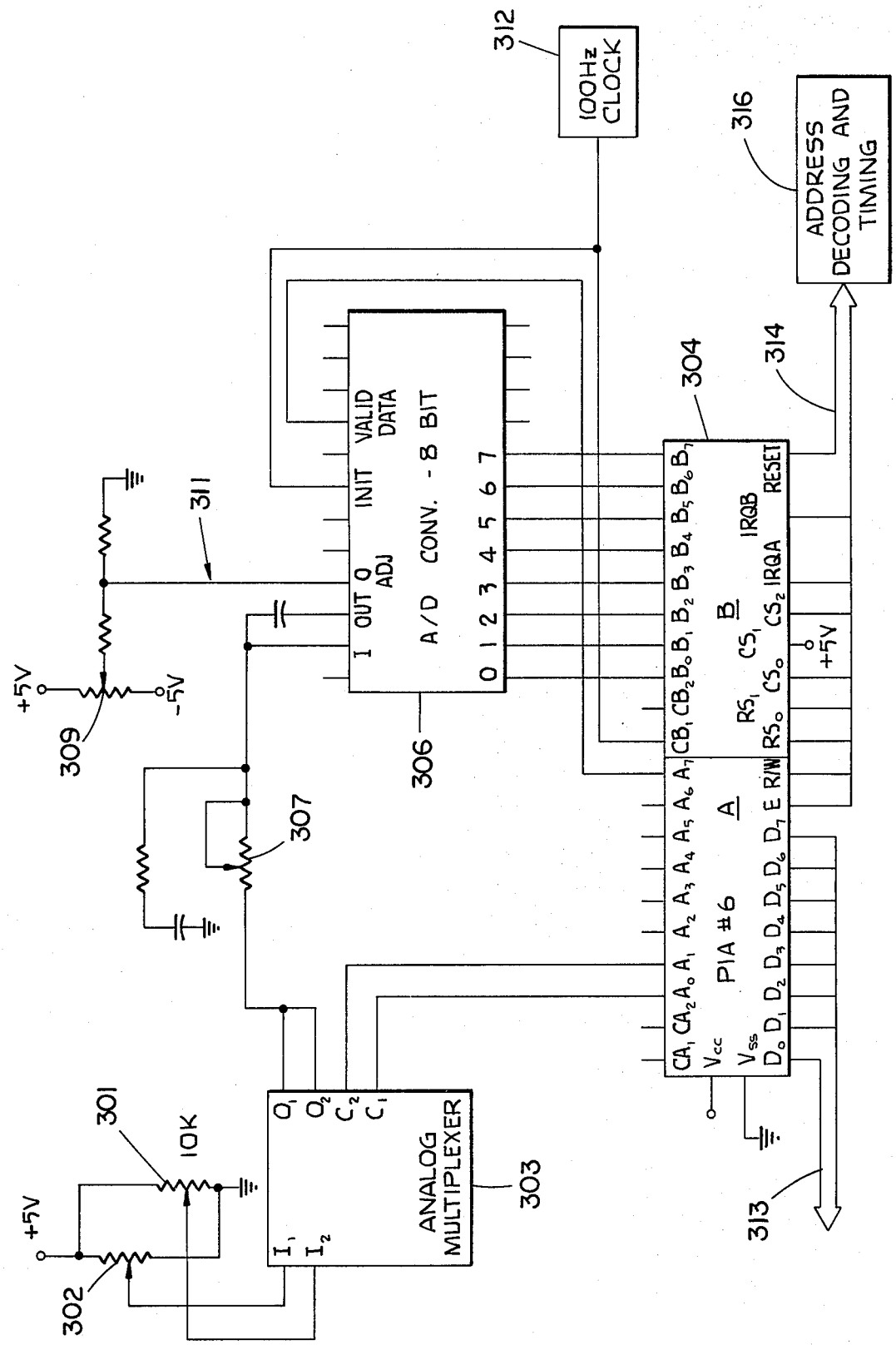
FIG. 12 is a circuit diagram of the feed rate adjust circuitry.

Referring now to FIG. 12, there is shown a simplified schematic diagram of the feed rate override control of the present system. Analog values from zero through +5 volts from potentiometer 301 (for table feed rate adjustment) or from potentiometer 302 (for spindle feed rate adjustment) are switched by means of an analog multiplexer 303. Potentiometers 301 and 302 are 10 K ohms each and correspond to the potentiometers 68 and 67, respectively, shown diagrammatically in FIG. 6.

The A0 and A1 outputs of PIA 304 are connected to the control pins of multiplexer 303 and select either the table potentiometer or spindle potentiometer voltage value to be encoded into an 8 bit code by analog to digital converter 306. Eight parallel bits are output from the analog-to-digital converter along the 0 through 7 bit outputs and connected to PIA number 6 inputs B0 through B7, respectively.

The system program scans the data output of PIA 304 to determine if a data-valid condition exists wherein the inputs of B0 through B7 may be coupled to the data outputs D0 through D7. The valid data output from analog to digital converter 306 is connected to the A7 input of PIA 304. Potentiometer 307 sets the full scale 8 bit output for a particular input voltage for the converter 306. Thus, when the output from multiplexer 303 is at its full five volt value, the output from potentiometer 307 to the input of the analog-to-digital converter 306 is set to produce all high outputs on bit outputs 0 through 7 of analog-to-digital converter 306. Potentiometer 309 sets the zero value for zero volts input. The ends of potentiometer 309 are at +5 volts and −5 volts respectively. The output of potentiometer 309 is coupled through a 100 K resistor to the zero adjust input of converter 306 on line 311. Line 311 is also coupled to ground through a 1K resistor, providing a voltage divider network for the zero adjust.

The various other inputs utilized, such as voltage supplies and current references, are supplied to converter 306 as necessary. Analog-to-digital converter 306 may be, for example, an 8700 CN type, manufactured by Teledyne. A 100 hertz clock 312 couples pulses to the input of the analog-to-digital converter 306 which initiates an output on output lines 0 through 7. The clock output is also coupled to the CB1 input of PIA 304 as a system interrupt. This interrupt causes a program factor to service the X, Y and Z servo routines. This is an interrupt opertaion described hereinafter in regard to the flow chart for the system program. In the course of servicing the X, Y and Z servo routines, changes in the settings for table feed rate or spindle feed rate at potentiometers 301 and 302 are noted by the program and the rates are recalculated. As generally shown in FIG. 12, the data outputs are coupled to the data bus at 313 and the various timing and addressing outputs of PIA 304 are coupled as shown at 314 to the address decoding and timing portion of the microcomputer.

As shown in FIG. 13a, the outputs on data lines 7 through 0 (most significant bit through least significant bit) effect different changes in feed rate. If only the most significant bit is high, indicating a mid range (two and one half volt) potentiometer output, the programmed feed rate value will be utilized. If the potentiometer is set between 0 and two and one half volts, less than half of the total bit weight of lines 7 through 0 will be present and the program value of feed rate will be multiplied by a fraction comprising the bit rate divided by 128. The FIG. 128 is 2 to the 7th power and represents half of the bit weight of lines 0 through 7 or all of the bit weight of lines 0 through 6.

If the potentiometer is set between two and one half and 5 volts, more than half of the bit weight will be applied, and in the two exemplary conditions shown, if the potentiometer is at 5 volts all bits are high and the feed rate will be the programmed value plus 6 inches per minute. If three quarters of the bit rate is applied, with bits 6 and 7 high, the feed rate will be the programmed value plus 3 inches per minute.

As shown in FIG. 13b, when the control is in a JOG mode, the two and one half volt, or half weight, feed rate is set at 50 inches per minute, for example. For voltages between zero and two and one half volts, this 50 inches per minute rate is multiplied by a fraction of bit weight divided by 128. For voltages between two and one half and five volts, the feed rate becomes 150 inches per minute multiplied by a fraction consisting of a bit rate divided by 256. 256 is two to the eighth power, or the full bit weight for lines 7 through 0.

Referring now to FIGS. 14–42, there is shown a flow chart of the basic operations of the software associated with the control system. These software operations are broken down into a plurality of subroutines with each step which is underlined within a block in the figures being further explained in a subsequent Figure as to its various substeps.

In general, the software in the memory of the microcomputer controls all of the basic functions of the machine. The software monitors the keyboard and the control switches on the control panel. Software also generates display messages on the CRT screen and operates the magnetic tape cassette unit. The operation of the cassette unit allows parts programs to be loaded on to tape and from tape. The software further controls the three servo axes, X, Y and Z, and controls the machine sequence and motion as it executes parts programs.

Referring now to FIG. 14, when power is applied to the system at the control panel, the program begins executing at BEGIN. This places the PIA's in proper state, clears the variable memory to start from the zero condition and enables the system interrupts.

As shown in FIG. 15, the INTERRUPT program, which is the heart of the servo positioning system, is executed 100 times per second by command of an external clock. Regardless of what the main program is doing, the INTERRUPT program is executed from beginning to end each time one of these 100 hertz clock pulses is received. The program checks for any keys pushed on a polling basis and stores their values to be retrieved by the main program at a later time. In the servo portion of the interrupt program, the desired position is compared to actual position and forms an output error signal to a digital-to-analog-converter. The program then determines the desired position by taking move commands from a command buffer and adding them to an error signal. The change in encoder reading for the particular axis motion being calculated is added to determine any motion taken place during the last interval. The resultant error signal then is the difference between desired position and actual position. This is applied to the velocity command of the motor control and adjusts the axis velocity to obtain the desired position. On each 100 hertz clock pulse, the X, Y and Z axis movements are checked.

In order to cause motion in any of the axes, it is only necessary to supply MOVE values to the command buffer. These MOVE values are the distance desired to move in one one hundredth of a second for each axis. If a continuous stream of MOVE values are loaded into the command buffer, each interrupt will remove one of the values and execute it. The axis will move along at the rate proportional to the size of MOVE values.

As further shown in FIG. 14, after BEGIN the SETMODE program is executed. This program is also executed each time a new mode is selected by the machine operator. This program sets the initial conditions and then jumps to one of the modes (ENTER, CHECK, SINGLE, OPERATE or EMERGENCY STOP).

Referring now to FIG. 16 the first of the 5 available modes reached from the SETMODE program is discussed. For ENTER mode, the ENTER program is executed. The program starts with data block one, displays values in that data block, and then sets up the inquiry scheme for each item in that data block. By pushing various keys on the control panel, the operator can advance to the next item within a data block or modify or enter values for the particular item being displayed. In ENTER, all of the items are displayed on the CRT and sequentially an inquiry is placed at the bottom of the CRT display for each item of the data block. The operator makes keyboard data and mode selection entries through the keyboard for each inquiry. The data block advance key and inquiry item advance key are located on the control panel as shown in FIG. 9. When the operator is satisfied with a particular data block, pushing the data block advance key increments the data block number and the next data block is displayed on the CRT. If the next data block has not yet been programmed, it is created by transferring forward data from the previous data block. This allows unchanged values to be carried forward and they do not need to be entered again on the keyboard by the operator. If data block zero is requested, a separate ENTER program is executed which allows X and Y offsets and tool data to be entered. The tool calibration length can be entered by actually moving the Z axis to a position and recording this point.

FIG. 17 shows the ENTER DBO routine and FIG. 18 shows the DISPLAY CURRENT DATA BLK routine from the ENTER PGM of FIG. 16.

Referring now to FIG. 19, CHECK MODE, the second of the five available modes, is shown. CHECK MODE can be entered through the SETMODE program and allows consecutive display of all of the data blocks which have been programmed. This CHECK MODE is for operator convenience in verifying that a proper program has been entered into the memory.

FIGS. 20 and 21 illustrates the next two modes enterable by the program. The SINGLE MODE program sets the single step flag and goes to the OPERATE program, to be discussed hereinafter. The EMERGENCY STOP program is entered whenever the emergency stop switch is activated on the control panel. It stops all motion and waits until the machine operator puts the machine in CHECK MODE. Then the emergency stop condition is released.

The fifth mode, and the principle mode in which the automatic machining of parts is done, is the OPERATE MODE. As shown in FIG. 22, the OPERATE PROGRAM allows manual jogging of the Z axis spindle and table calibration as well as data block parts program execution. When the start key is pushed, in JOG MODE, a displacement is entered in and the feed rate is set to 50 inches per minute and the DOMOVE program is executed.

The DOMOVE program is shown in FIG. 38. The DOMOVE program calculates the move increments which are fed to the INTERRUPT program which actually drive the three axis servos. The program determines whether a Z move is desired or an XY move. If an XY move is desired, the program obtains feed rate and modifies it according to the feed rate pot. It then calculates the distance that X needs to move by taking XD (X desired) minus X position (present location of X). It does the same for Y and then calculates DL (total length to be moved, taking the square of the sum of the squares of DX and DY). Next the number of iterations required to move this distance at the proper feed rate is calculated. NNN equals the length required to move multiplied by the steps per minute, which in this case is 6,000, based on the one hundred times per second execution of the INTERRUPT program.

Now that the number of steps have been calculated, the size of each step (for example, X increment) is calculated by taking the X distance to be moved divided by the number of steps. Also, Y INCREMENT equals the total Y movement to be made divided by the number of steps. This X INCREMENT and Y INCREMENT will be added to the X and Y position NNN times. This is done by the INTERPOLATE program. If a Z move is required, a similar calculation is made to determine NNN and Z increment.

The INTERPOLATE program calls the LEAD SCREW COMPENSATION program five times a second. The INTERPOLATE program checks to see whether the feed rate pot has changed. If the JOG mode is being executed the program returns whenever the start button is released by the operator.

After doing these things, the INTERPOLATE program counts down NNN. If this quantity is equal to zero, the move is completed and the program goes to FINISH MOVE. Otherwise, it adds the increment calculated earlier to the actual position and updates the position for each of the three axes. It then calculates a MOVE value and when the command buffer has an opening, places the three MOVE values in this buffer. Command buffer values are being used by the INTERRUPT program so it may be necessary to wait until a value has been moved by the INTERRUPT program. This allows the INTERPOLATE program to calculate several move values ahead and guarantees that data will always be available to the INTERPOLATE program.

The INTERPOLATE program also displays on the CRT screen the present instantaneous X, Y and Z values. It then loops, claculates the next move value, and waits again to place it into the command buffer. When NNN has reached zero, the move is complete and X position has reached the X desired value. FINISH MOVE (FIG. 41) sets them precisely equal and returns to the calling program. It can be seen that if XD, YD or ZD is set to a desired location, the DOMOVE program will take care of moving the servos at the proper feed rate to that location. The FRATE and LEAD SCREW COMP subroutines are shown in FIGS. 39 and 40, respectively.

Returning to the OPERATE program (FIG. 22), if the AUTO position mode is selected and start button is pushed, the AUTO program is then called to execute a parts program stored as data blocks. The XYCAL, ZTCAL, ZZERO and XYMARKER subroutines cited in the OPERATE program are shown in FIGS. 23, 24, 25 and 26, respectively.

As shown in FIG. 24, the Z axis spindle calibration is carried out by adding the Z offset saved from the previous tool to the Z position to arrive temporarily at an "absolute" Z position. Then the current tool calibration length for a new tool is entered as a current Z offset distance which is subtracted from the "absolute" Z position to arrive at a new Z position for the current tool. Then the new Z offset is saved for subsequent Z calibration routines. The CALLENGTH is obtained as a step in the calibration operations of DBZERO as shown in FIG. 17. As discussed above, when the Z axis is manually moved to a desired zero reference plane, the tool length calibration may be entered through the TOOL CAL button 223. Generally, the tool length calibration for each tool to be used is entered and stored in the memory of the microcomputer and recalled as each tool is utilized.

The AUTO program reads the data block and decides on the type or mode (POSITION, MILL, DRILL or BORE). Each of these modes is a sequence of operations to take the milling machine through the desired action. The AUTO SEQUENCE, beginning with NEXTDB, is shown in FIG. 27.

If the selected function or mode is POSITION (FIG. 28) a retract is executed, bringing the Z spindle up. This is accomplished by setting the Z desired to ten inches, setting RAPID and executing the DOMOVE program until the Z up limit switch is actuated. After Z is up, POSITION reads the XY values from the data block, sets RAPID and executes DOMOVE. This brings the table to the XY position called out in the data block. WAIT ERROR SMALL delays the program until the servos are in position within several thousandths. After this, the portion of the program NEXTDB is executed (FIG. 27).

NEXTDB checks for data block stop, which returns to the OPERATE program or it increments to the next data block. If the program is in single cycle, or if a tool is to be changed, control is returned to the OPERATE program, otherwise, the loop is repeated, which jumps to the proper program type and that data block is executed.

MILL (FIG. 29) goes through the sequence of lowering the spindle to the Z down dimension, getting the XY data from the data block, and executing DOMOVE. Therefore, the table will move at the program feed rate to the XY value. After DOMOVE, a WAIT ERROR SMALL subroutine is executed, and then a check of the next data block is made. If the next data block is not also a MILL mode, a Z retract is performed, bringing the spindle up. This completes the data block of MILL and the next data block is executed.

In a MILL operation, before the DOMOVE step, if an inside or outside frame milling operation has been entered in the data block the program goes to FRAME. The operator will have chosen either inside, outside or none for possible frame milling for the MILL data block. As shown in FIG. 29, if either inside or outside milling is selected, the FRAME milling subroutine is executed (FIG. 43).

For an inside frame milling operation, for example, a first data block would position the tool at the proper location on the workpiece to begin the frame milling operation. The next data block would be the MILL data block wherein the operator inserts the desired inside frame milling and enters the X and Y distances for the tool to travel. As shown in the FRAME milling subroutine of FIG. 43, the Z axis is moved in the four directions necessary to complete the frame milling and then the spindle is retracted. As indicated in DRILL in FIG. 30, in the middle block after WAIT ERROR SMALL, if the next data block contains an inside or outside frame milling step, the X and Y positions are offset by one half the current tool diameter. This enables the operator to program X and Y dimensions for the frame milling actually desired to be accomplished rather than having to take into consideration the tool diameter. After the ZRETRACT operation of FIG. 43, the XY offset is removed so that the XY positioning returns to its true value for subsequent operations.

BORE mode sets the bore flag and then proceeds as if it were a DRILL mode.

DRILL mode execution is as follows. The spindle is retracted. The XY values are obtained from the data block. A move is made in RAPID to those XY values, and a WAIT ERROR SMALL subroutine is performed. A RAPID move to the Z up position is made with a WAIT ERROR SMALL subroutine. If PECK mode is set, a separate DOPECK program is then executed. Otherwise, Z is moved to the down position at the program feed rate. A delay of three tenths of a second takes place and then a check of the next data block type is made.

If it is a MILL, that data block is then executed without retracting the spindle. Or if the bore flag is set, the spindle is retracted slowly at the programmed feed rate to Z up. Otherwise, Z retract is executed, which brings the spindle back up to the top position and the next data block in sequence is then executed.

The subroutines for Z RETRACT GET XY FROM DATA BLK, WAIT ERROR SMALL, Z TO DOWN, RAPID TO Z UP and SLOW TO Z UP are set forth in FIGS. 31, 32, 33, 34, 35 and 36, respectively.

During all motions, lead screw compensation is being calculated and applied to the move. This takes the position times the lead screw error which is entered into the program through jumper wires and calculates a lead screw correction, which is added to the desired position when it is fed to the INTERRUPT program.

The DOPECK program, which is an option of the DRILL mode, divides the drill stroke, or distance between ZUP and ZDOWN, by the desired number of pecks. This distance ZD is then used to carry the Z desired position into the workpiece M peck times, with a retract to ZUP between each peck. This enables chips to be cleared when drilling a large hole. The DOPECK subroutine is shown in FIG. 37.

As shown in FIG. 42, the REPEAT program allows execution of nested step and repeats. This allows a pattern to be repeated N times at various X or Y offset distances. When a step and repeat is started, certain conditions are stored onto a STP/REP stack. When the REPEAT BLOCK is encountered, the number of times NX and NY are stored onto the stack and a loop is made back to the beginning data block. Each time the REPEAT is encountered in this loop, the X or Y positions are modified by the step values and the counters are decremented. When both X and Y counters have reached zero, the pattern is repeated the proper number of times, and the next data block is executed.

The REPEAT program may be devised, for example, to permit nesting up to three loops deep. The beginning data block of a loop is flagged by being selected by the operator as a STP/REP block as indicated in the AUTO program of FIG. 27. This STP/REP-indicated data block further contains the usual information such as for a MILL, DRILL, etc. This flagged block may then be followed by one or more data blocks containing the balance of the steps of the operation to be repeated, and this series of blocks is concluded with a repeat block. The repeat block contains an incremental X dimension and a count of the number of X operations, an incremental Y dimension and a number of counts for Y direction operations. The program operates to perform all of the X repeats for a given Y dimension and then moves to the next Y dimension for another series of operations in the X direction. An example of a simple type of repeat program which may be prepared by the operator of the machine would be a pattern of drilled holes in a workpiece in an array such as two by three, four by five, etc.

The utilization of a repeat block to eliminate the need for reentering data in a data block for identical operations and the use of the frame milling operations described above are exemplary programming tools for the operator of the machine.

While there have been described above the principles of this invention in connection with specific apparatus, it is to be clearly understood that this description is made only by way of example and not as a limitation in the scope of the invention.

What is claimed is:

1. A programmable microcomputer control apparatus for controlling the relative motion between a tool and a workpiece comprising:

indicator means for providing at an output digital signals indicative of the relative position between the tool and the workpiece;

an alterable memory operable to retain a control program and control parameters;

a microprocessor unit coupled to the output of the indicator means and to the memory and operable to produce control signals dependent upon said indicator means output and said control parameters according to said control program;

control means for directing said control signals from the microprocessor unit to appropriate motion-providing means;

interface means for transferring a control program and control parameters from an external medium into said alterable memory and for recording the control parameter contents of said memory onto an external medium;

data entry means for loading control parameters into said memory through externally accessible data inputs independently of said interface means; and display means for displaying control parameters, said control program being operable to display control parameter inquiries on the display means, whereby an operator may load control parameters into said memory through said data entry means in response to the inquiries, said apparatus including means to sequentially display data block inquiries and to display, in response to the loading of certain contol parameters into said memory relating to the data block inquiries, separate displays of additionl control parameter inquiries relating to information used in the data block which was the subject of the previous inquiry, whereby the sequential display of inquiries and direct loading of control parameters as to an operation can be used to make the use of the device simpler and more responsive to the operator.

2. The apparatus of claim 1 in which said interface means includes means for reading from and writing onto a magnetic stored information input.

3. The apparatus of claim 2 in which said means for reading and writing comprises a tape cassette transport.

4. The appratus of claim 1 in which the display means comprises a CRT display.

5. The apparatus of claim 1 in which said interface means and said data entry means comprise a pendently mounted control panel, and further comprising a cabinet and a mounting arm extending upwardly and outwardly from the top of said cabinet, the control panel being attached to the end of said arm further from the cabinet.

6. The apparatus of claim 4 which further comprises a machine bearing said tool and said workpiece and including motion-providing means receiving said conrol signals, said cabinet being positioned on one side of said machine and said arm extending over a portion of the machine such that the control panel is pendently mounted on the other side of the machine, whereby the machine operator may have convenient access to the control panel.

7. A programmable microcomputer control apparatus for controlling the relative motion between a tool and a workpiece comprising:
indicator means for providing at an output digital signals indicative of the relative position between the tool and the workpiece;
an alterable memory operable to retain a control program and control parameters;
a processor unit coupled to the output of the indicator means and to the memory and operable to produce control signals dependent upon said indicator means output and said control parameters according to said control program, said control signals including programmed rate signals for controlling the rate of relative motion between the tool and the workpiece;
control means for directing said control signals from the processor unit to appropriate motion-providing means;
interface means for transferring a control program and control parameters from an external medium into said alterable memory and for recording the control parameter contents of said memory onto an external medium;
data entry means for loading control parameters into said memory through externally accessible data inputs independently of said interface means; and
feed rate adjust means externally and manually settable independent of said control parameter for altering said rate signals to vary the rate of relative motion between the tool and the workpiece.

8. The apparatus of claim 7 in which the programmed rate of relative motion between the tool and the workpiece dependent upon said control parameters is reduced by the feed rate adjust means through effecting a multiplication of the programmed rate by a fraction less than unity and said programmed rate is increased through adding a proportionate rate increment between two preset values.

9. The apparatus of claim 7 which further comprises means for positioning the tool at a desired calibration location in a first direction relative to the workpiece and in which the indicator means includes means for providing a signal indicative of displacement of a tool holder relative to a reference location, said signal being a tool length calibration signal when the tool is placed in said calibration location, said indicator means providing said output digital signal indicative of the relative position between the tool and the workpiece after taking into account said tool length calibration signal.

10. A programmable microcomputer control apparatus for controlling the relative motion between a tool and a workpiece comprising:
indicator means for providing at an output digital signals indicative of the relative position between the tool and the workpiece;
an alterable memory operable to retain a control program and control parameters;
a microprocessor unit coupled to the output of the indicator means and to the memory and operable to produce control signals dependent upon said indicator means output and said control parameters according to said control program;
control means for directing said control signals from the microprocessor unit to appropriate motion-providing means;
interface means for transferring a control program and control parameters from an external medium into said alterable memory and for recording the control parameter contents of said memory onto an external medium;
data means for loading contol parameters into said memory through extenally accessible data inputs independently of said interface means; and
means associated with said control program for enabling the microprocessor unit to produce control signals which produce, through appropriate motion-providing means, repetitive relative motions between the tool and the workpiece at a series of different relative locations and including means for entering feed rate and Z coordinate data for the repetitive motions only once and entering (1) an instruction to repeat and (2) and X and Y coordinate information for the repeating motions in order to undergo the repetitive motions.

11. A method for automatically and interactively performing machining operations on a workpiece comprising the steps of:
entering the mode type and dimensional parameters for a machining operation into a microcomputer memory as a data block;
repeating said entering step for data blocks for any further operations and dimensions as necessary to complete processing of the workpiece; and
executing a microcomputer program utilizing said data blocks to direct a machine to perform said operations on a workpiece;
displaying on screen sequentially for observation and response by the operator, a plurality of inquiries regarding mode and dimensional parameters for individual data blocks; and as to at least some of the individual data blocks, utilizing operator response to initiate and implement subsequent display of additional inquiries for observation and response by the operator to further define the parameters of the data block as to an operation.

12. The method of claim 11 and further comprising the steps of:

displaying the inquiries in normal spoken language of the operator and identifying possible responses by numbers, and entering responses by operator selection of keyboard number entries corresponding to desired responses to inquiries.

13. The method of claim 11 and further comprising the step of:

establishing zero referencing of a workpiece in a first data block; and employing workpiece zero referencing data in the first data block as the workpiece reference for two axes of workpiece movement in automatic execution of the program to perform said operations on a workpiece.

14. The method of claim 13 and further comprising the step of:

establishing zero referencing of a tool, in said first data block; and employing tool zero referencing data in the first data block as the reference for a third axis of relative movement between tool and workpiece in automatic execution of the program to perform said operations on a workpiece.

15. The method of claim 14 and further comprising the step of:

employing zero referencing data in the first data block as the reference for data entered and operations executed for all subsequent data blocks.

16. The apparatus of claim 7 in which said feed rate adjust means control alters the rates of relative motion between the tool and the workpiece in both the X and Y directions, but not in the Z direction.

17. The apparatus of claim 7 in which said feed rate adjust means control alters the rates of relative motion between the tool and the workpiece in the Z direction, but not in the X or Y direction.

18. The apparatus of claim 17 which additionally includes a second feed rate adjust means externally settable independent of said control parameter for altering said rate signals to vary the rate of relative motion between the tool and the workpiece in both the X and Y directions, but not in the Z direction.

19. The apparatus of claim 7 in which said feed rate adjust means control includes a manually operable potentiometer and the manual operation of the potentiometer can be accomplished during the operation of the apparatus to effect a change in the feed rate.

* * * * *

REEXAMINATION CERTIFICATE (2507th)
United States Patent
Roch et al.

[11] B1 4,477,754
[45] Certificate Issued Mar. 21, 1995

[54] INTERACTIVE MACHINING SYSTEM

[75] Inventors: Gerald V. Roch, Indianapolis, Ind.; James P. Wiles, Olean, N.Y.; Chris L. Hadley, Indianapolis, Ind.

[73] Assignee: Hurco Companies, Inc., Indianapolis, Ind.

Reexamination Request:
No. 90/003,365, Mar. 22, 1994

Reexamination Certificate for:
Patent No.: 4,477,754
Issued: Oct. 16, 1984
Appl. No.: 305,511
Filed: Sep. 25, 1981

Related U.S. Application Data

[63] Continuation of Ser. No. 151,909, May 21, 1980, abandoned, which is a continuation of Ser. No. 702,569, Jul. 6, 1976, abandoned.

[51] Int. Cl.$^6$ .............. G05B 19/42; G05B 19/425
[52] U.S. Cl. .............. 318/568.1; 318/568.25; 318/569; 318/572; 364/189; 364/191; 364/474.18; 364/474.22; 364/474.32
[58] Field of Search ............... 318/568.1, 568.22, 569, 318/570, 571, 572, 575; 364/180, 181, 191, 474.01, 474.18, 474.22, 474.26, 474.32; 340/706, 711, 717, 721

[56] References Cited

U.S. PATENT DOCUMENTS

| | | |
|---|---|---|
| 3,668,653 | 6/1972 | Fair et al. |
| 3,720,814 | 3/1973 | Klein |
| 3,746,845 | 7/1973 | Henegar |
| 3,783,253 | 1/1974 | Anderson |
| 3,812,474 | 5/1874 | Linn et al. |
| 3,821,525 | 6/1974 | Eaton et al. |
| 3,827,030 | 7/1974 | Seipp |
| 3,932,795 | 1/1976 | Kliphuis |
| 3,932,796 | 1/1976 | Kreithen |

FOREIGN PATENT DOCUMENTS

51-13083  2/1976  Japan .

OTHER PUBLICATIONS

Kishi NC Software with translation.
NC Handbook with translation.
Numerical Controls for Lathes with translation.
Yasukaw Denki, No. 3 1974, vol. 38, No. 147, Numerical Controls for Lathes.
Kishi NC Software, Kogyo Chasaki, 1972.
Galloway et al., General Aviation Design Synthesis Utilizing Interactive Computer Graphics, Society of Automotive Engineers, Bus. Aircraft Mtg. Apr. 6-9, 1976.
Shortlifle, Computer-Based Medical Consulations, MYCIN, 1976, American Elseier Publishing Co., Inc.
NC Handbook, edited by Editorial Committee of the NC Handbook, Nikkan Kegyo Shinbun, Ltd., May 25, 1972, pp. 68, 78-79, 220-240.

*Primary Examiner*—Jonathan Wysocki

[57] ABSTRACT

A microprocessor numerical control for a milling machine including means for programming part features by the machine operator at the machine location. The control apparatus includes a CRT display which provides an inquiry system, and a keyboard for entry of data by the machine operator. The control system further includes a tape cassette deck operable to read or write data or program material into or out of the processor memory. The control system regulates motion in the X, Y and Z directions for the milling machine and also includes an external feed rate adjustment for either the XY plane or the Z axis direction which may be utilized by the machine operator to affect the programmed feed rates. There is further provided automatic tool length calibration and cutter diameter compensation for milling operations.

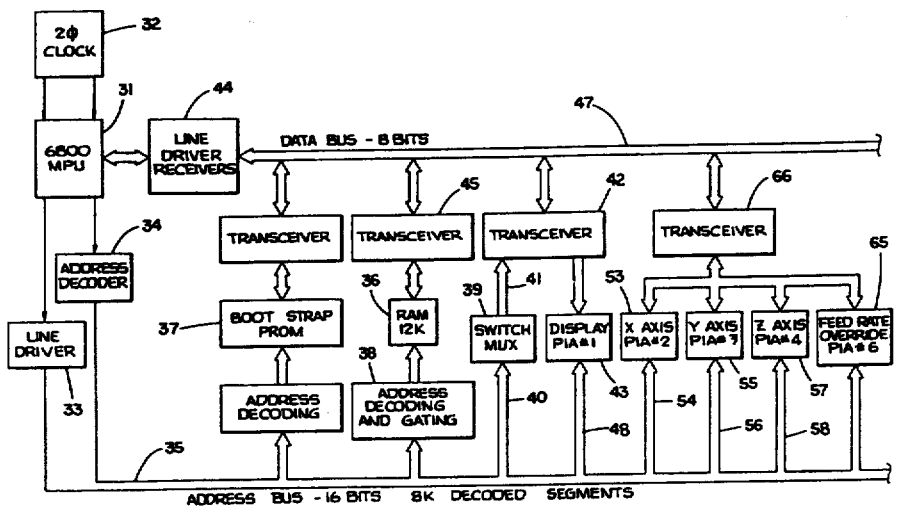

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-5 and 11-15 is confirmed.

Claims 6, 7 and 10 are determined to be patentable as amended.

Claims 8, 9 and 16-19, dependent on an amended claim, are determined to be patentable.

6. The apparatus of claim [4] *5* which further comprises a machine bearing said tool and said workpiece and including motion-providing means receiving said control signals, said cabinet being positioned on one side of said machine and said arm extending over a portion of the machine such that the control panel is pendently mounted on the other side of the machine, whereby the machine operator may have convenient access to the control panel.

7. A programmable microcomputer control apparatus for controlling the relative motion between a tool and a workpiece comprising:

indicator means for providing at an output digital signals indicative of the relative position between the tool and the workpiece;

an alterable memory operable to retain a control program and control parameters;

a processor unit coupled to the output of the indicator means and to the memory and operable to produce control signals dependent upon said indicator means output and said control parameters according to said control program, said control signals including programmed rate signals for controlling the rate of relative motion between the tool and the workpiece;

control means for directing said control signals from the processor unit to appropriate motion-providing means;

interface means for transferring a control program and control parameters from an external medium into said alterable memory and for recording the control parameter contents of said memory onto an external medium;

data entry means for loading control parameters into said memory through externally accessible data inputs independently of said interface means; and feed rate adjust means externally and manually settable independent of said control [parameter for altering] *parameters, said feed rate adjust means coupled to said processor unit, said processor unit recalculating* said rate signals *dependent on said feed rate adjust means* to vary the rate of relative motion between the tool and the workpiece.

10. A programmable microcomputer control apparatus for controlling the relative motion between a tool and a workpiece comprising:

indicator means for providing at an output digital signals indicative of the relative position between the tool and the workpiece;

an alterable memory operable to retain a control program and control parameters;

a microprocessor unit coupled to the output of the indicator means and to the memory and operable to produce control signals dependent upon said indicator means output and said control parameters according to said control program;

control means for directing said control signals from the microprocessor unit to appropriate motion-providing means;

interface means for transferring a control program and control parameters from an external medium into said alterable memory and for recording the control parameter contents of said memory onto an external medium;

data means for loading control parameters into said memory through externally accessible data inputs independently of said interface means; and means associated with said control program for enabling the microprocessor unit to produce control signals which produce, through appropriate motion-providing means, repetitive relative motions between the tool and the workpiece at a series of different relative locations and including means for entering feed rate and Z coordinate data for the repetitive motions only once and entering (1) an instruction to repeat and (2) [and] X and Y coordinate information for the repeating motions in order to undergo the repetitive motions.

* * * * *